United States Patent
Wright et al.

(10) Patent No.: US 7,363,594 B1
(45) Date of Patent: Apr. 22, 2008

(54) WORKFLOW EVENT EDITOR

(75) Inventors: John Wright, Prairie Village, KS (US); Tracy Packham, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 844 days.

(21) Appl. No.: 10/260,071

(22) Filed: Sep. 30, 2002

Related U.S. Application Data

(60) Provisional application No. 60/404,788, filed on Aug. 19, 2002.

(51) Int. Cl.
*G06F 3/00* (2006.01)

(52) U.S. Cl. ................. 715/969; 715/758; 715/751; 715/739; 715/748; 705/8; 705/9

(58) Field of Classification Search ........... 715/969, 715/758, 751, 739, 748; 705/8, 9
See application file for complete search history.

(56) References Cited

U.S. PATENT DOCUMENTS

| | | | | |
|---|---|---|---|---|
| 5,301,320 | A * | 4/1994 | McAtee et al. | 705/9 |
| 5,890,130 | A * | 3/1999 | Cox et al. | 705/7 |
| 5,960,420 | A * | 9/1999 | Leymann et al. | 707/1 |
| 6,115,646 | A * | 9/2000 | Fiszman et al. | 700/181 |
| 6,137,470 | A * | 10/2000 | Sundstrom et al. | 715/786 |
| 6,505,219 | B1 * | 1/2003 | MacLean et al. | 715/530 |
| 6,574,605 | B1 * | 6/2003 | Sanders et al. | 705/8 |
| 6,630,944 | B1 * | 10/2003 | Kakuta et al. | 715/758 |
| 6,720,967 | B1 * | 4/2004 | Cox et al. | 345/440 |
| 6,868,413 | B1 * | 3/2005 | Grindrod et al. | 706/59 |
| 6,978,292 | B1 * | 12/2005 | Murakami et al. | 709/204 |
| 7,027,997 | B1 * | 4/2006 | Robinson et al. | 705/9 |
| 7,065,493 | B1 * | 6/2006 | Homsi | 705/8 |
| 2002/0029161 | A1 * | 3/2002 | Brodersen et al. | 705/9 |
| 2002/0040313 | A1 * | 4/2002 | Hunter et al. | 705/9 |
| 2002/0040352 | A1 * | 4/2002 | McCormick | 705/80 |
| 2002/0181017 | A1 * | 12/2002 | Such et al. | 358/1.15 |
| 2003/0018830 | A1 * | 1/2003 | Chen et al. | 709/328 |
| 2003/0023622 | A1 * | 1/2003 | Obermeyer et al. | 707/500 |
| 2003/0036994 | A1 * | 2/2003 | Witzig et al. | 705/38 |
| 2003/0055668 | A1 * | 3/2003 | Saran et al. | 705/1 |
| 2003/0084127 | A1 * | 5/2003 | Budhiraja et al. | 709/220 |
| 2003/0088433 | A1 * | 5/2003 | Young et al. | 705/1 |

(Continued)

FOREIGN PATENT DOCUMENTS

EP 000603513 A2 * 4/1993

OTHER PUBLICATIONS

Vitria Business Cockpit Brochure, 2001.

(Continued)

*Primary Examiner*—Sy D. Luu
*Assistant Examiner*—Ryan Pitaro

(57) ABSTRACT

A workflow manager which executes software having one or more channels configured to communicate events-based messages between processes. Events are associated with transitions between states, which mark the progress of an order. An event remains in an associated channel for a period until is retrieved by a peripheral system or expired. When retrieved by a system, the event may trigger a task or process. The workflow manager further includes an event editor, coupled to the workflow manager and configured to retrieve a selected event for editing by a user. The event editor includes a graphical user interface allowing a user to define, monitor, or modify a workflow.

18 Claims, 8 Drawing Sheets

U.S. PATENT DOCUMENTS

| | | | |
|---|---|---|---|
| 2003/0126181 A1* | 7/2003 | Young | 709/100 |
| 2003/0195790 A1* | 10/2003 | Wepfer et al. | 705/9 |
| 2003/0225462 A1* | 12/2003 | Bachman et al. | 700/1 |
| 2004/0010796 A1* | 1/2004 | Paul et al. | 719/328 |
| 2004/0015366 A1* | 1/2004 | Wiseman et al. | 705/1 |
| 2004/0078373 A1* | 4/2004 | Ghoneimy et al. | 707/10 |
| 2004/0187089 A1* | 9/2004 | Schulz | 717/101 |
| 2004/0193465 A1* | 9/2004 | Sangroniz et al. | 705/8 |
| 2004/0254465 A1* | 12/2004 | Sano et al. | 600/443 |
| 2005/0160361 A1* | 7/2005 | Young | 715/513 |

OTHER PUBLICATIONS

Vitria Communicator Data Sheet, 2001.
Vitria Communicator Product Brief, 2001.
Vitria Architecture Overview, May 22, 2002.

* cited by examiner

WORKFLOW EVENT EDITOR

CROSS-REFERENCE TO RELATED APPLICATIONS

This application claims priority to Provisional Application 60/404,788 filed Aug. 19, 2002 entitled "Telecom Provisioning Workflow Models" which is incorporated by reference.

BACKGROUND

The preferred embodiments of the present invention relate generally to improvements in information technology. More particularly, the preferred embodiments relate to management of event-based messaging workflows. More particularly still, the preferred embodiments relate to a method and related system for defining, monitoring and modifying a workflow using a graphical user interface.

Many large companies have several different organizations each performing their own unique business functions. A particular business organization may handle incoming orders from customers, while another organization may manage shipping merchandise to customers. It is not uncommon for each organization to have a multitude of computer systems and platforms, these systems of one organization varying greatly from the systems of another organization. Further, these systems and associated software packages may be either commercially available or proprietary. Unfortunately, these organizations often have redundant systems and applications that significantly increase the cost of doing business.

As businesses tend to thrive on efficient operations and rapid execution, delays in communicating information between one organization and another may have an adverse effect on customer satisfaction and profits. Existing, or "legacy," systems often operate on various hardware platforms and in various programming languages. To communicate information between one system and another, the two systems must somehow interface, so that any dissimilarity is resolved, allowing them to transfer information accurately and efficiently.

Integrating business applications running on varied systems is a multi-dimensional problem that requires an understanding of software interfaces, information formats, network transmission models, data transformation, security, connectivity and system administration details. Integrating multiple systems into a streamlined, efficient workflow involves communicating various business tasks between the appropriate systems while also reducing errors and redundant efforts. Integration difficulties are often magnified when a company becomes involved in a merger or acquisition or undergoes an internal reorganization. The combined business enterprise may have both duplicate and discrete systems that must be integrated. This problem can be addressed with "event-based messaging," a technology which is easy for employees to use and easy for developers to program, and also allows virtually seamless communications between dissimilar systems and applications.

Workflow management, which relates to the automation of business tasks, or processes, is an emerging technology closely associated with corporate streamlining activities. Fundamentally, it is an information technology model for reducing business costs, improving operation efficiency, and facilitating an adaptive business organization. Business processes (e.g. order processing, product delivery scheduling) are generally defined in such a way that they can be directly interpreted and executed by a workflow manager, which can take the form of one or more central servers. A major inhibitor to the development of workflow is understanding the mechanisms, interactions and inter-relationships of these tasks, as even small business may develop hundreds of such tasks as a workflow matures.

Generally, a central workflow manager acts as a central clearinghouse to coordinate messages between numerous individual systems. The workflow manager is linked with each system by one or more "channels," which are communications pathways for delivering queued event-based messages between the workflow manager and peripheral systems, as well as between different processes within the workflow manager. Typically, the workflow manager will place an event into a channel, where the event will remain until it is retrieved by the target system. The event may have a set expiration period, so that it will not be enacted if not retrieved by a certain deadline, or may alternately be a guaranteed-delivery event, which will not expire.

After retrieving and acting on an event, a system may insert another event designated for the workflow manager into a return channel. Once the event is retrieved by the workflow manager, the workflow manager may recognize that a certain task has been performed. The workflow manager will then address the next task in the workflow by placing a subsequent event into a channel designated for the next targeted system. Events may pass to or from the workflow manager, depending on the system for which they are targeted. Essentially, the workflow manager follows a set procedure for notifying various systems of tasks to be performed, receiving confirmation that the events reached their destinations and following up with subsequent tasks.

Conventional workflow models do not allow straightforward monitoring or modification of an active workflow. In the case of a system fault, it may be necessary to edit the information in an event, in order to send a different message to the targeted system. Additionally, it may be necessary to insert an entirely new event into the workflow sequence, to counter the unexpected fault. Moreover, in a case where there is no error or fault, it may simply be desired to modify the workflow to address a recently discovered business need. In order to anticipate such a need, it is also necessary to be able to monitor progress of the workflow. It is therefore desired to develop a graphical interface method and related system for defining, monitoring, testing and modifying a workflow model.

BRIEF SUMMARY

The problems noted above are solved in large part by a system and related method for modifying a business workflow. The preferred embodiments of the present invention relate to a business network comprising a workflow manager, which executes software having one or more channels. The workflow manager comprises multiple servers, one or more of which are coupled to at least one peripheral computer system that carries out a step in an order fulfillment method. More particularly, the preferred embodiments relate to a graphical user interface for modifying, monitoring or testing a workflow.

The business workflow is managed by a workflow manager, which is linked to a plurality of peripheral systems, which execute various tasks or processes associated with a business function, such as a new order. Still more particularly, the preferred embodiments include a web-based interface. In addition, the graphical user interfaces of the preferred embodiments may be communicated to a user by placing an information-carrying medium, such as a floppy disk, CD-ROM or downloadable file, in operational relation with a computer. Alternate embodiments of the present invention may possess a terminal interface or any number of traditional computing interfaces, such as that of a standard desktop software package.

The preferred embodiments also include a method of interacting with a workflow manager, the method including providing a list of events in a graphical user interface, wherein the list indicates events in a channel in the workflow manager. The method of the preferred embodiments further includes retrieving from the channel a selected event from the list of events, and displaying the selected event in editable form in the graphical user interface. Communications between the workflow manager and the at least one peripheral computer system are accomplished by events in one or more channels. Each channel is a communications pathway between the workflow manager and various peripheral systems.

A channel is configured to communicate events between processes, where events that signify transitions between order states. An event persists in an associated channel for a time period until it is either retrieved by the target system or expired. The preferred embodiments further include an event editor coupled to the workflow manager and configured to retrieve a selected event for editing by a user. The event editor is further configured to provide a list of events associated with a user-selected channel. The event editor is also configured to display a retrieved event in editable form, and to accept modifications to the event.

The preferred embodiments further include an information-carrying medium that, when placed in operable relation with a computer, provides graphical user interface views to a user. These views include a namespace view that automatically provides a list of channels in a selected software instance, a channel view that automatically provides a list of events in a channel selected from the list of channels, and an event view that automatically displays a selected event from the list of events. The selected event is automatically displayed in editable form, and the event view also displays an icon that causes transmission of the selected event as edited to an identified channel. Further, the preferred embodiments provide that an event may be injected into a specified channel or instance, prompting an order to move forward within the workflow. The workflow may also be tested in this manner by artificially generating an event, which may then prompt a reply from the target system.

The disclosed systems and methods comprise a combination of features and advantages that enable it to overcome the deficiencies of the prior art. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular operations or computing entities. As one skilled in the art will appreciate, information technology companies may refer to computing processes, components, and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . "

The term "computer" is intended to mean a computing entity, which may be a server, terminal, personal or other computer, or a network of computing entities working together as a unit. The term "workflow" refers to a series of operations and the order in which they are performed. The term "server" refers to a computing entity which is generally linked to and performing some service for one or more computing entities. The terms "task" and "process" are used synonymously herein, and refer to individual operations in the workflow. The term "system" refers to a computing entity designated to perform workflow tasks. The term "workflow manager" refers to one or more servers acting as a central clearinghouse to coordinate the workflow between a plurality of peripheral computing systems.

The term "function" generally refers to a business function, or mission of a particular organization, and should not be confused with a software "task" or "process." The term "application" refers to an executable software package or program that can be run on a system. The term "interface" refers to a mode of interaction between a user and computer, or alternately, between two computing systems or applications. The term "console" refers to a computing entity with which a user can actively interact. The term "channel" refers to a data structure and associated software processes that together form a communications pathway between different processes and/or different systems. The term "event" refers to a basic messaging unit, sent through a channel, which triggers a workflow operation and/or communicates information between the workflow manager and linked systems. To the extent that any term is not specially defined in this specification, the intent is that the term is to be given its plain and ordinary meaning.

DETAILED DESCRIPTION OF THE PREFERRED EMBODIMENTS

Figure 1:
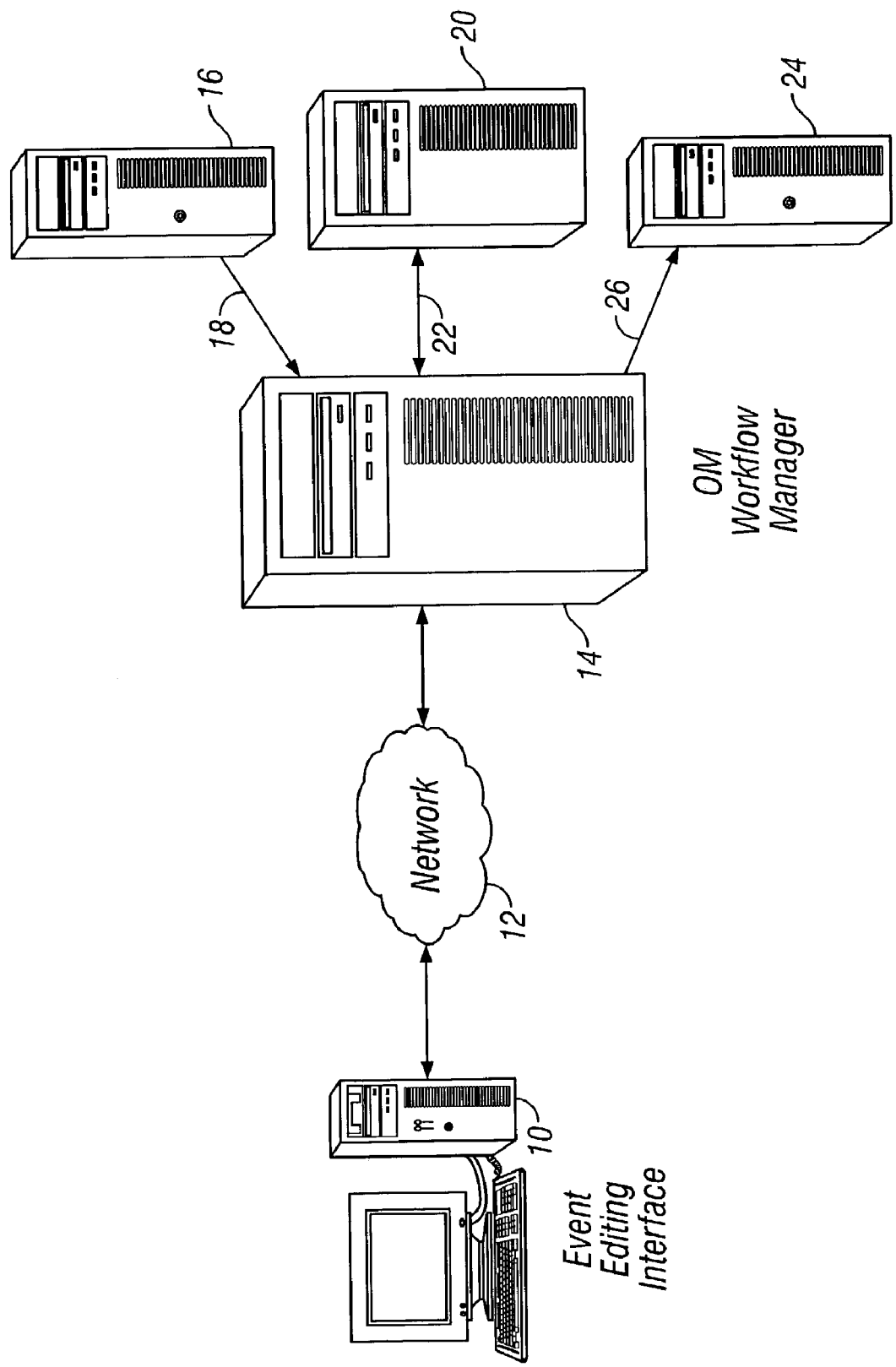
FIG. 1 shows a workflow management system in accordance with the preferred embodiments.

The preferred embodiments of the present invention disclose a method and related system for monitoring, testing or modifying of a business workflow by an event editor. The preferred embodiments enable a user to monitor, test, and modify a workflow model through a computer interface. Referring now to FIG. 1, event editor 10 is linked to workflow manager 14 by net 12, which is a computing connection that may include an intranet, an internet, local area network (LAN) or wide area network (WAN) connection. In one preferred embodiment, interface 10 is a web-based console featuring a graphical user interface, which may communicate information to a user in the form of a web page or a frame within a web page. However, it will be understood that event editor 10 may alternately possess a terminal interface or any number of traditional computing interfaces, such as that of a standard desktop software package. Further, the graphical user interfaces of the preferred embodiments may be communicated to a user by placing an information-carrying medium, such as a floppy disk, CD-ROM or downloadable file, in operational relation with a computer.

Central workflow manager 14 includes one or more internal servers that receive and send out event-based messages, or "events," to communicate between internal processes and a multitude of linked systems. Events are associated with transitions between states, which mark the progress of an order. In the simplified setup shown in FIG. 1, a task such as new order entry may be performed at system 16. An event may then be placed into channel on workflow manager as denoted by arrow 18, a communications pathway between system 16 and central workflow manager 14, where the event may remain for a period of time until it is retrieved or expires. Arrows 18, 22, 26 in FIG. 1 represent channels and not a physical connection. The event may remain in channel 18 until retrieved by workflow manager 14, which then recognizes that a certain task has been performed and that a subsequent action needs to be taken. An event is then placed into channel 22, where is remains until it is retrieved by another system 20. This event may trigger an action at system 20, such as a product shipping verification procedure. System 20 may then recognize that it must confirm completion of this action in order for the next step in the workflow to take place, and consequently places a subsequent event, such as "shipped today," into channel 22. Once retrieved by workflow manager 14, a follow-up event, such as "order completed," may then be placed into channel 26 by the workflow manager. System 24 may then retrieve the follow-up event and perform an associated task (e.g. billing).

Figure 2:
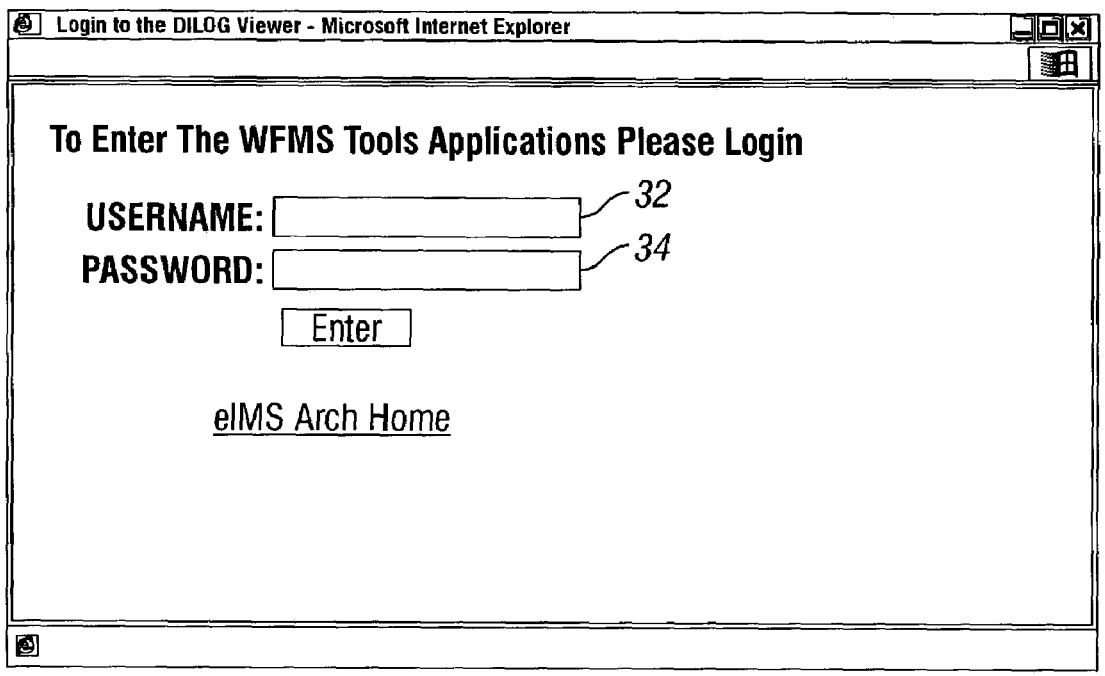
FIG. 2 shows a web-based logon screen of the preferred embodiments.
Figure 3:
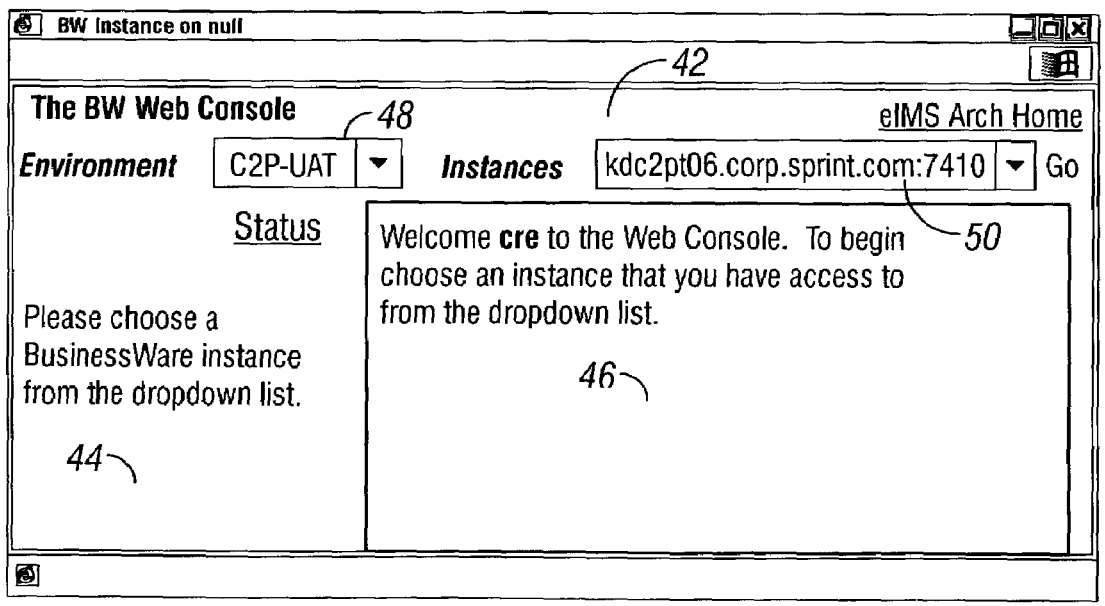
FIG. 3 shows a web console screen of the preferred embodiments allowing environment and instance selection.

As shown in FIG. 2, a first embodiment of the present invention has a web-based interface. A user is required to log in at logon screen 30 using username field 32 and password field 34. Referring now to FIG. 3, after password verification, the user is taken to main console screen 40, which includes three frames: header frame 42, left frame 44, and right frame 46. Header frame 42 allows the user to choose from a selection of environments 48, or servers, which then displays all instances 50 within the chosen environment, where an instance refers to a single launch of workflow management software on a server. Each individual server may be executing multiple instances to carry out workflow management of multiple business processes. Left frame 44 displays the instance namespace view, which is a structured listing of all defined variables for the instance, and right frame 46 displays information related to the user's choice in the left frame (if any).

Figure 4:
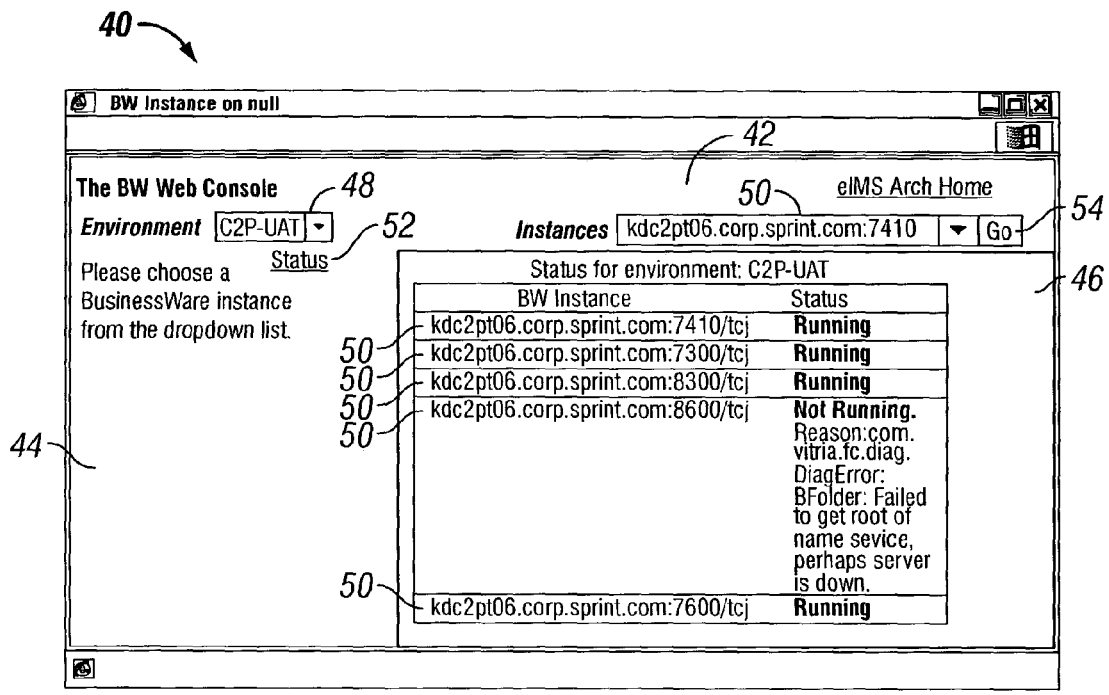
FIG. 4 shows a web console screen of the preferred embodiments displaying the statuses of all instances within a selected environment.
Figure 5:
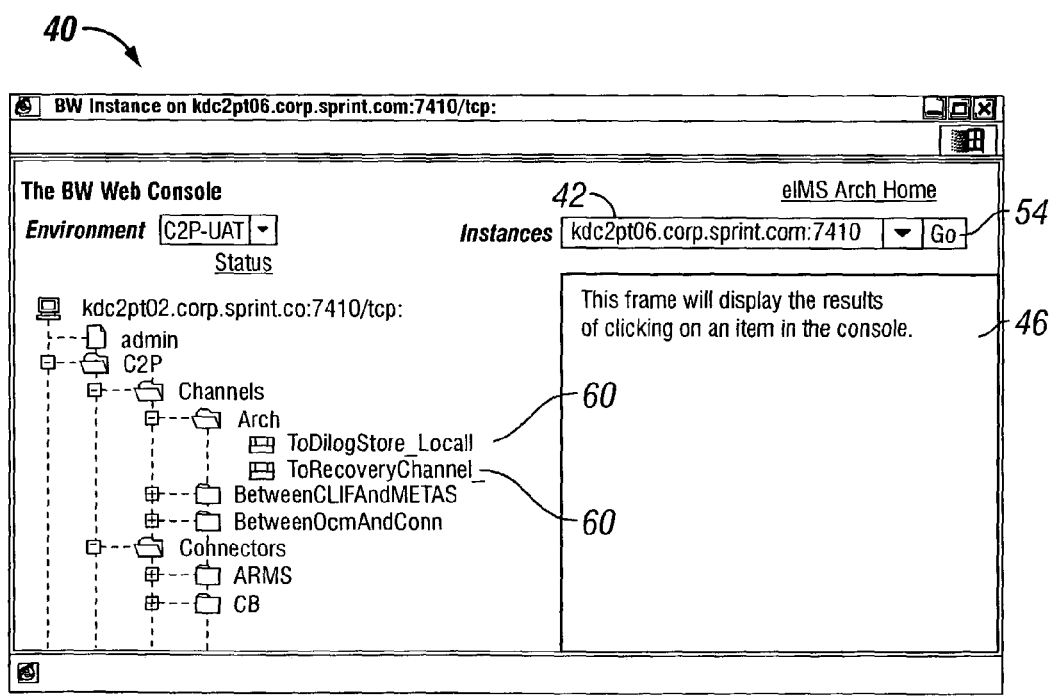
FIG. 5 shows a web console screen of the preferred embodiments displaying channels and other sub-items within a selected instance.
Figure 6:
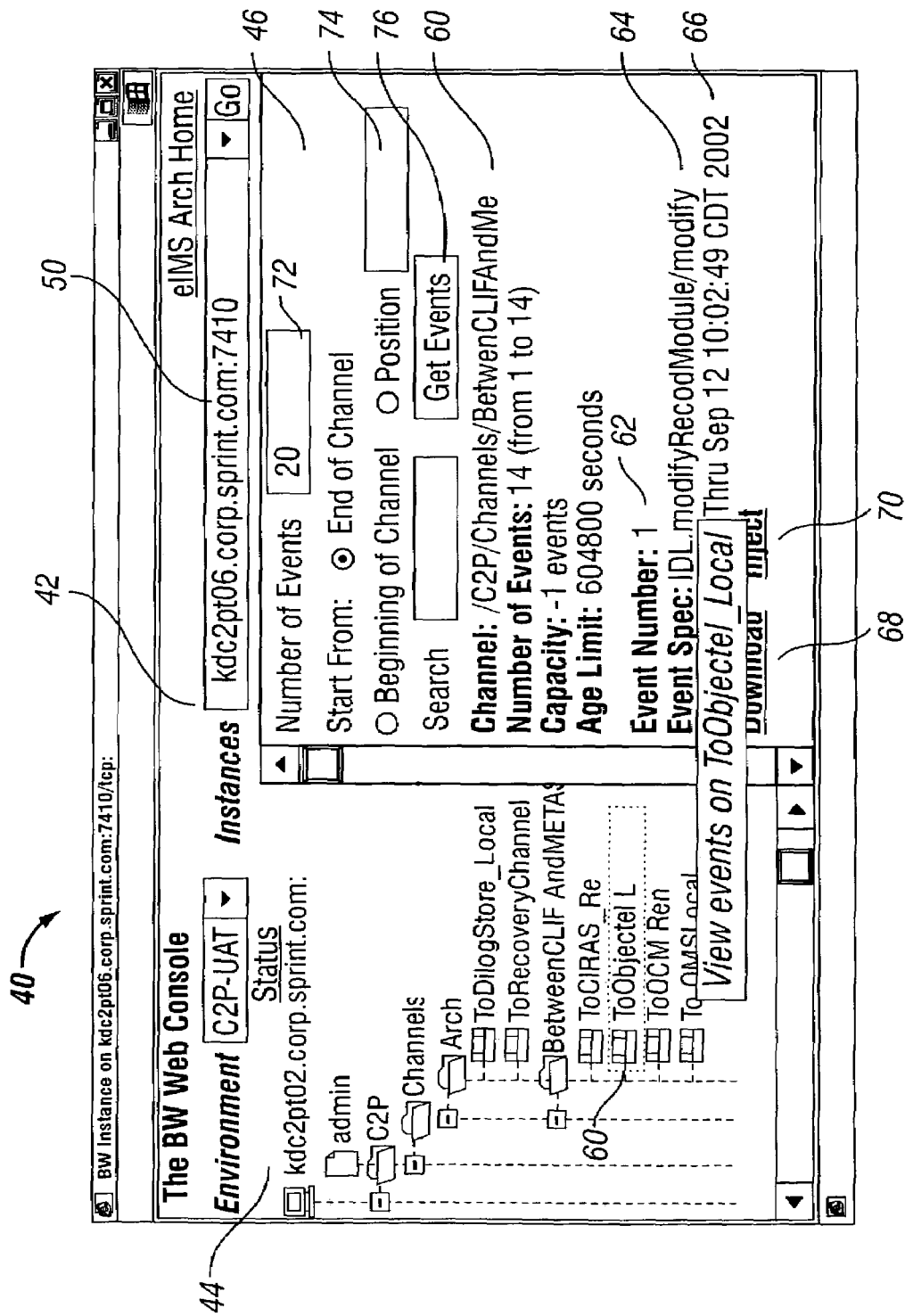
FIG. 6 shows a web console screen of the preferred embodiments displaying event information, including sorting, downloading and injecting options.

Referring now to FIG. 4, selecting status function 52 on console screen 40 will display the status of all instances 50 for selected environment 48 in right frame 46. A particular instance 50 can be navigated by selecting it in header frame 42, then clicking button 54, which then pulls up details of the instance as shown in FIG. 5. Left frame 44 displays a variety of nested choices corresponding to the top-level selected instance 50, which includes automators, connectors or channels 60. Selecting a channel 60 will display a channel view in right frame 46 as shown in FIG. 6. Right frame 46 displays events 60 residing in selected channel 60.

From right frame 46 as shown in FIG. 6, many functions can be performed. Information about events can be obtained, including event number 62, which gives the order of the queued events, event ID 64, which is a short description of an event's meaning, and timestamp 66, which tells when the event was placed into channel 60. A download option 68 is present for each event, allowing a user to download the event in XML format. Selecting inject option 70 allows a user to transmit a given event to this or another channel. Injecting an event into another channel may act to move an order further along in the workflow, which may be useful in case of a system failure or other occasion in which it is desired to speed the workflow process. Event display number textbox 72 allows the user to specify the number of events to display at once within right frame 46, so that more or fewer events can be monitored simultaneously. Right frame 46 also contains event position selection section 74, which has multiple options allowing a user to designate whether events from the beginning or end of a channel are displayed, or to display an event in a particular position in queue. Search section 76 allows searching for events based on certain parameters.

Figure 7:
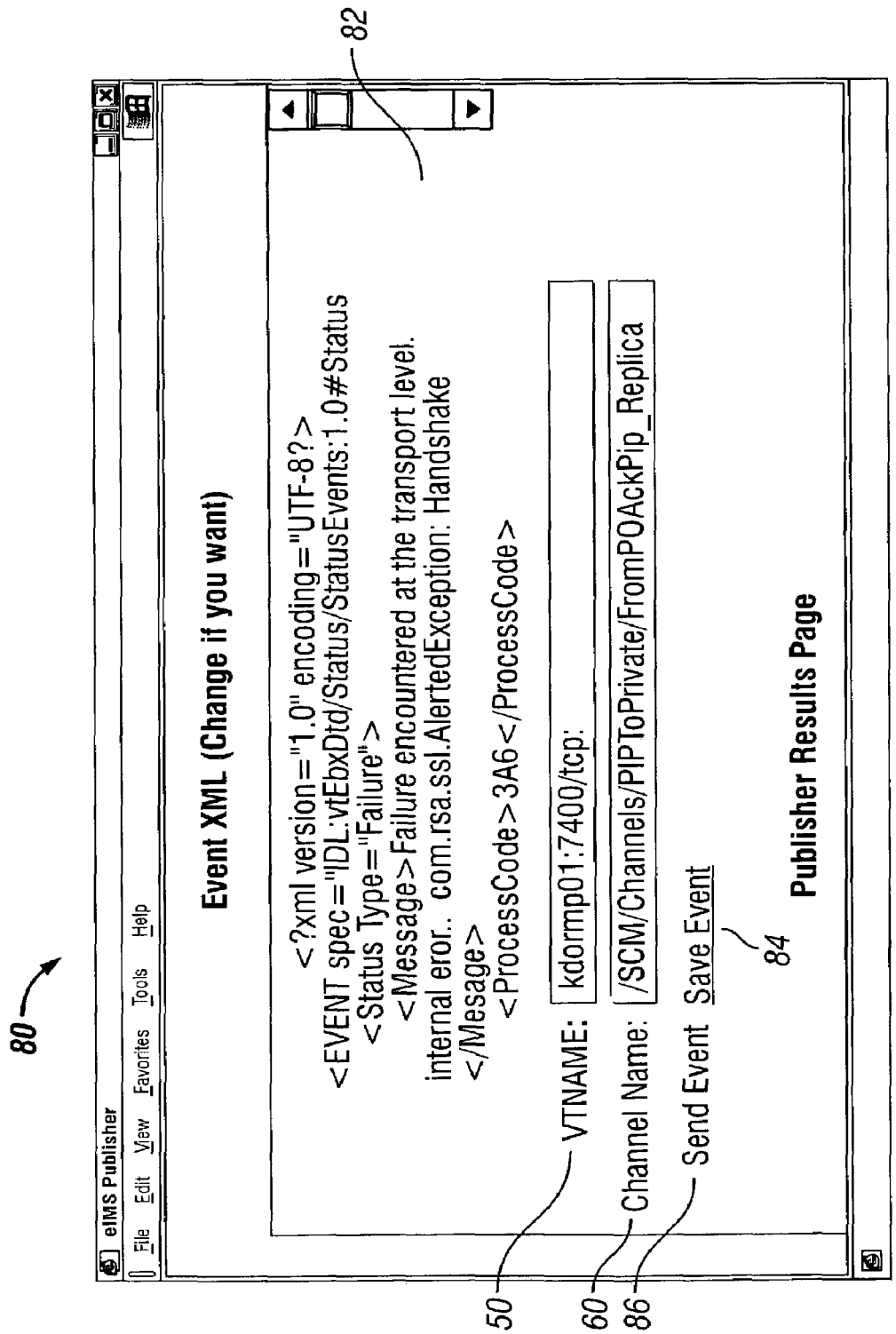
FIG. 7 shows an event editing screen in accordance with the preferred embodiments.
Figure 8:
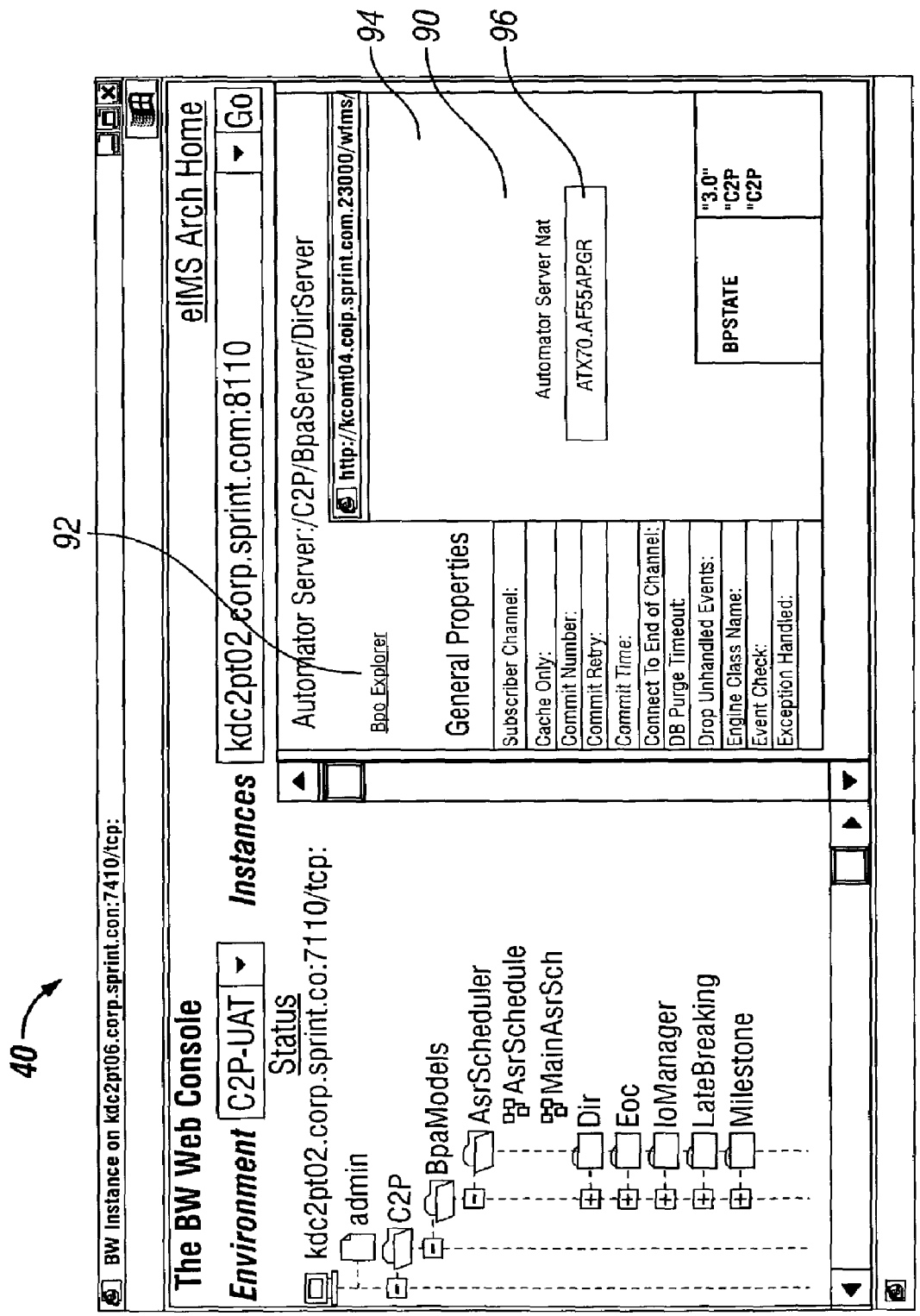
FIG. 8 shows a web console screen of the preferred embodiments detailing automation server information.
Figure 8A:
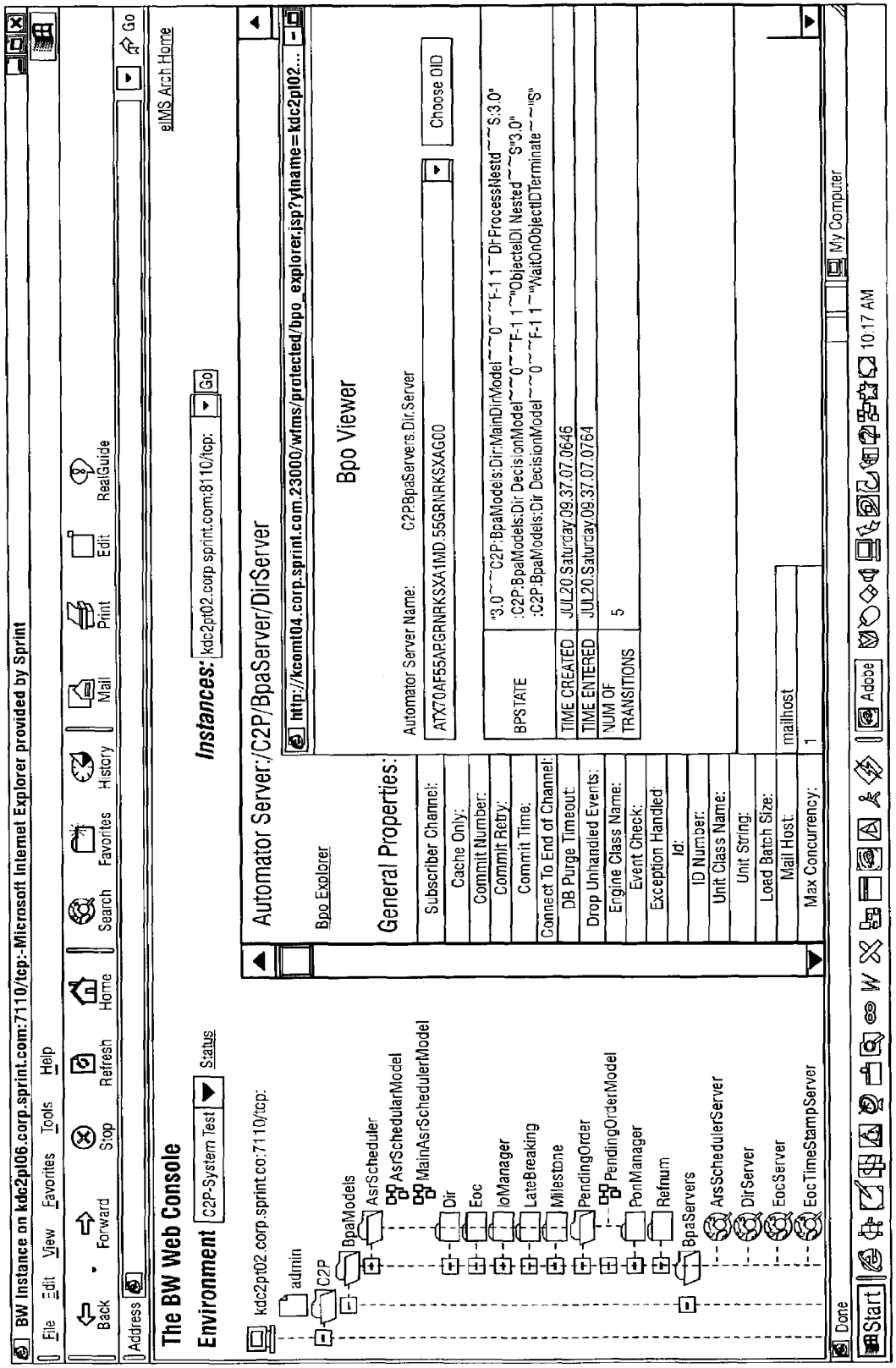

Selecting inject option 70 in right frame 46 pulls up Event XML view 80, as shown in FIG. 7. From screen 80, a user can change event parameters by editing text window 82, if desired. Additionally, the event can also be placed within another instance 50 or channel 60 by selecting icon 86. Selecting save option 84 also allows a user to save the event in XML format to a file on a local storage device. Referring now to web console 40 as shown in FIG. 8, if a user selects an instance 50 containing an automator 90, which is a software application responsible for executing multiple workflow models, right frame 46 will display numerous properties of the selected automator 90. In addition, if Business Process Object (Bpo) Explorer option 92 is selected, Bpo Viewer window 94 will appear, allowing a user to view the status of a business process object, which is synonymous with an item (e.g. a single order) moving through the workflow. Bpo Viewer window 94 also allows a user to select an Object Identifier (Oid) 96, the nametag associated with a business process object.

Figure 9:
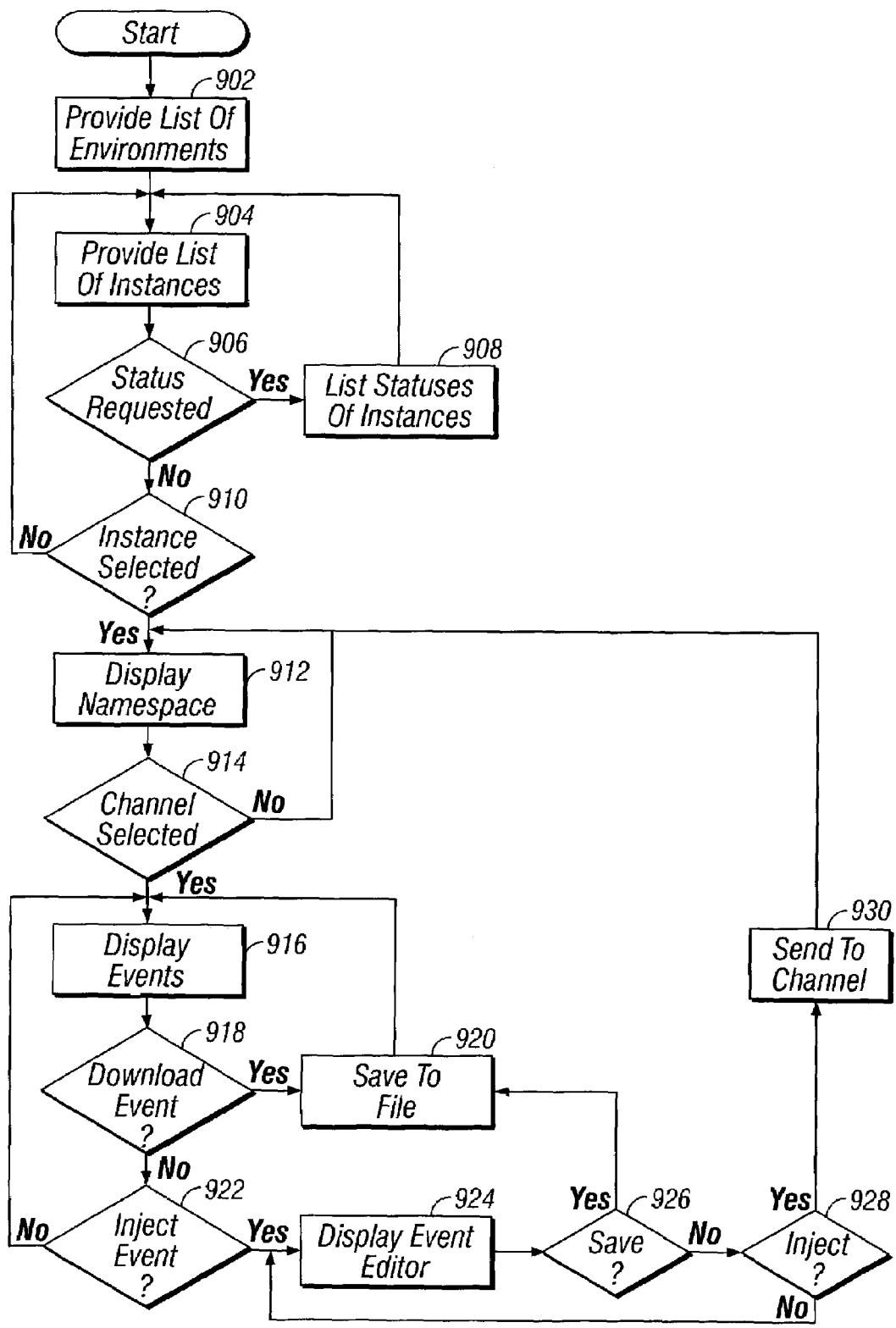
FIG. 9 shows a flowchart diagram of options in event editor of the preferred embodiments.

FIG. 9 summarizes the method of the preferred embodiments. In block 902, a list of environments, or servers, is provided from which a user may select. In block 904, a list of instances is provided from which a user may select. Block 906 allows a user to request the status of a particular server. Block 908 displays the statuses of all instances of a selected server. Block 910 displays the namespace associated with a selected instance. In block 914, a list of channels is provided from which a user may select. Block 916 displays all events within the selected channel. Block 918 allows a user to download an event. In block 920, a user is given the option of saving the event to a file. Block 922 allows a user to inject the event into another channel. In block 924, a user may edit the event. Block 926 allows a user to save any changes made to the event. Block 928 allows a user to inject the event into a specified channel. Block 930 sends the event to the designated channel.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A business network comprising:
   a plurality of different systems, each configured to perform at least one task in one or more business processes, wherein each business process includes an ordered series of tasks;
   a workflow manager that executes and coordinates the ordered series of tasks of the one or more business processes between the plurality of different systems;
   a plurality of channels, each configured to communicate events of the one or more business processes between at least one of the plurality of different systems and the workflow manager, wherein each of the events persist in one of the plurality of channels for a period of time until the at least one of the plurality of different systems or the workflow manager acts on the event, and wherein each of the events is associated with a transition between states that indicate progress of the ordered series of tasks of the one or more business processes; and
   an event editor remotely communicating with the workflow manager and configured to retrieve a selected event corresponding with the executing one or more business processes from a selected channel of the plurality of channels for editing by a user, wherein the event editor is outside the process path of the one or more business processes.

2. The network of claim 1, wherein the workflow manager executes at least one business process that tracks order states, and wherein each event corresponding to the at least one business process is associated with a transition between order states.

3. The network of claim 2, wherein each event corresponding to the at least one business process includes an identifier of an associated order.

4. The network of claim 1, wherein the event editor is further configured to provide a list of the one or more channels, from which a user can select the selected channel.

5. The network of claim 4, wherein the event editor is further configured to provide a list of events associated with the selected channel.

6. The network of claim 5, wherein the event editor is further configured to display a retrieved event in editable form, and to accept modifications to the event.

7. The network of claim 6, wherein the event editor is further configured to send a modified event to a user-selected channel.

8. The network of claim 1, wherein the workflow manager comprises multiple servers, one or more of which are coupled to at least one of the plurality of different systems.

9. A method comprising:
   implementing one or more software instances on a plurality of systems, each software instance configured to perform at least one task in a business process that includes an ordered series of tasks;
   coordinating execution of the ordered series of tasks of the business process between the plurality of systems through a workflow manager;
   communicating one or more events between the software instances on the plurality of systems and the workflow manager, each event corresponding to a transition between states that indicates progress of the ordered series of tasks of the business process, wherein the one or more events are communicated through one or more channels between the workflow manager and each of the plurality of systems, and wherein the one or more events persist for a period of time in the one or more channels until a corresponding one of the plurality of systems or the workflow manager retrieve the one or more events;
   implementing a graphical user interface on an event editor that remotely communicates with the workflow manager through a channel other than the one or more channels;
   providing a list of the one or more channels in the graphical user interface from which a channel is selected;
   providing a list of events in the graphical user interface, wherein the list of events indicates events in the selected channel and the list of events are events of the executing business process;
   retrieving from the selected channel, a selected event from the list of events; and
   displaying the selected event in editable form in the graphical user interface.

10. The method of claim 9, further comprising:
    sending the selected event to a selected channel.

11. The method of claim 9, further comprising:
    accepting modifications to the selected event; and
    sending the modified event to a selected channel.

12. The method of claim 9, wherein the method further comprises:
    providing a list of the software instances in the graphical user interface from which an instance is selected, wherein selection of an instance causes the providing of the list of channels.

13. The method of claim 12, wherein the method further comprises:
    providing a list of environments in the graphical user interface from which an environment is selected, wherein selection of an environment causes said providing of the list of software instances.

14. An information-carrying medium that, when placed in operable relation with a computer, provides graphical user interface views including:
    a namespace view that automatically provides a list of channels between a workflow manager and one or more systems that implement a selected software instance, wherein each of the one or more systems perform at least one task in one or more business process that includes an ordered series of tasks, and wherein the workflow manager executes and coordinates the ordered series of tasks of the one or more business processes between the one or more systems;
    a channel view that automatically provides a list of events in a channel selected from the list of channels, wherein the list of events are active events corresponding with the execution of the one or more business processes, wherein each event is associated with a transition between states that indicate progress of the ordered series of tasks of the one or more business process, and wherein each event persists for a period of time in the channel until one of the one or more systems or the workflow manager acts on the event; and
    an event view that automatically displays a selected event from the list of events,
    wherein the selected event is automatically displayed in editable form, and
    wherein the event view also displays an icon that causes transmission of the selected event as edited to an identified channel.

15. The medium of claim 14, wherein the event view also displays a field for selecting said identified channel.

16. The medium of claim 14, wherein the editable form is an editable text window having the selected event in XML format.

17. The medium of claim 14, wherein each of the views is a frame in a web page.

18. The medium of claim 14, wherein each of the views is a web page.

* * * * *